US010207360B2

(12) United States Patent
Wadehn et al.

(10) Patent No.: US 10,207,360 B2
(45) Date of Patent: Feb. 19, 2019

(54) DETERMINING DEVIATIONS OF AN ACTUAL POSITION OF A LASER MACHINING HEAD FROM A DESIRED POSITION

(71) Applicant: TRUMPF Laser- und Systemtechnik GmbH, Ditzingen (DE)

(72) Inventors: Wolf Wadehn, Nussdorf (DE); Tobias Hagenloche, Ditzingen (DE)

(73) Assignee: TRUMPF Laser- und Systemtechnik GmbH, Ditzingen (DE)

(*) Notice: Subject to any disclaimer, the term of this patent is extended or adjusted under 35 U.S.C. 154(b) by 437 days.

(21) Appl. No.: 15/044,270

(22) Filed: Feb. 16, 2016

(65) Prior Publication Data

US 2016/0158884 A1 Jun. 9, 2016

Related U.S. Application Data

(63) Continuation of application No. PCT/EP2014/001944, filed on Jul. 16, 2014.

(30) Foreign Application Priority Data

Aug. 28, 2013 (DE) .................. 10 2013 217 126

(51) Int. Cl.
*B23K 26/03* (2006.01)
*B23K 26/08* (2014.01)
(Continued)

(52) U.S. Cl.
CPC ............ *B23K 26/03* (2013.01); *B23K 26/042* (2015.10); *B23K 26/0884* (2013.01); *G05B 19/402* (2013.01); *G05B 2219/45165* (2013.01)

(58) Field of Classification Search
CPC .. B23K 26/03; B23K 26/042; B23K 26/0884; B23K 26/034; B23K 26/04; G05B 19/402; G05B 2219/45165
(Continued)

(56) References Cited

U.S. PATENT DOCUMENTS 5,400,638 A 3/1995 Kim
8,379,204 B1* 2/2013 Cordingley .......... B23K 26/043
356/399
(Continued)

FOREIGN PATENT DOCUMENTS

CN 102066036 A 5/2011
CN 103079746 A 5/2013
(Continued)

OTHER PUBLICATIONS

International Search Report from corresponding PCT Application No. PCT/EP2014/001944, dated Nov. 11, 2014, 6 pages.

*Primary Examiner* — Brian W Jennison
(74) *Attorney, Agent, or Firm* — Fish & Richardson P.C.

(57) ABSTRACT

Implementations of the present disclosure include methods, systems, and computer-readable storage mediums for determining a deviation between an actual position and a desired position of a laser machining head of a laser machining machine. Implementations include actions of selecting at least two different machining positions of the laser machining head, in which a laser beam emitted by the laser machining head is directed onto a desired position of a workpiece, moving the laser machining head into a first selected machining position and forming a through-opening into the workpiece at or around the desired position by operation of the laser beam, moving the laser machining head into a second selected machining position and detecting radiation generated by an interaction between the laser beam and the workpiece, and determining whether there is a deviation between an actual position of the laser machining head and the desired position based on the detected radiation.

22 Claims, 2 Drawing Sheets

(51) Int. Cl.
*B23K 26/042* (2014.01)
*G05B 19/402* (2006.01)

(58) Field of Classification Search
USPC .................................................... 219/121.85
See application file for complete search history.

(56) References Cited

U.S. PATENT DOCUMENTS

| | | |
|---|---|---|
| 9,452,544 B2 | 9/2016 | Hagenlocher et al. |
| 2001/0023862 A1 | 9/2001 | Hartmann et al. |
| 2013/0186871 A1 | 7/2013 | Suzuki et al. |
| 2014/0175071 A1 | 6/2014 | Pfitzner et al. |

FOREIGN PATENT DOCUMENTS

| | | |
|---|---|---|
| CN | 103203552 A | 7/2013 |
| CN | 203124969 U | 8/2013 |
| DE | 19963010 A1 | 7/2001 |
| DE | 102007013623 A1 | 10/2008 |
| EP | 1530107 A2 | 5/2005 |
| EP | 1750891 A1 | 2/2007 |
| JP | 2001224228 A | 8/2001 |
| WO | WO 2012/110129 | 8/2012 |
| WO | WO2012130666 A1 | 10/2012 |
| WO | WO2013000622 A1 | 1/2013 |

\* cited by examiner

DETERMINING DEVIATIONS OF AN ACTUAL POSITION OF A LASER MACHINING HEAD FROM A DESIRED POSITION

CROSS-REFERENCE TO RELATED APPLICATIONS

This application is a continuation of and claims priority under 35 U.S.C. § 120 to PCT Application No. PCT/EP2014/001944 filed on Jul. 16, 2014, which claims priority to German Application No. DE 10 2013 217 126.9, filed on Aug. 28, 2013. The contents of both of these priority applications are hereby incorporated by reference in their entirety.

TECHNICAL FIELD

The invention relates to methods, systems, and apparatus for determining deviations between an actual position of a laser machining head of a laser machining machine and a desired position of the laser machining head.

BACKGROUND

Various calibration systems have been proposed. For example, U.S. Pat. No. 5,400,638 describes a calibration system in which a robot starts up and measures a reference component at various test points using a camera and a displacement sensor, where the reference component is located on a base body of the robot. It is possible in this way to determine changes in the length of the robotic arm that are dependent upon temperature, and subsequently compensate them.

In the case of the robot, but also in the case of other known machining machines, such as laser machining machines, the reference component does, however, constitute an interfering contour in the respective machining area, which may lead to collisions. Furthermore, it takes a lot of time and is technically complex to adjust the reference component in the correct position for the purpose of the measuring described above. It is, moreover, problematic that a collision-related deviation that is comparatively small cannot always be recognized with the human eye. Such misalignments do, however, consequently lead to erroneously manufactured components, e.g., to expensive rejects.

SUMMARY

One aspect of the invention features a method of determining a deviation between an actual position of a laser machining head of a laser machining machine and a desired position of the laser machining head. The method can overcome the drawbacks of time-consuming, expensive, and technically complex calibrations. The method includes the following procedural steps:
a) selecting at least two different machining positions of the laser machining head, including a first selected machining position and a second selected machining position, in which the laser beam emitted by the laser machining head is directed onto a same desired position of a workpiece fixed to the laser machining machine, the laser machining head being movably mounted along multiple axes of motion;
b) moving the laser machining head into the one selected, first machining position and forming a through-opening into the workpiece at the desired position or around the desired position of the workpiece by operation of the laser beam; and
c) moving the laser machining head into the other selected, second machining position and detecting radiation which is generated by an interaction between the laser beam and the workpiece, and calculating a maximum deviation as a function of a size of the through-opening and first and second selected machining positions. In response to determining that no radiation is detected, the method further includes determining that the actual position of the laser machining head deviates from the desired position of the laser machining head by less than the calculated maximum deviation; and otherwise, in response to determining that radiation is detected, the method further includes determining that the actual position of the laser machining head deviates from the desired position of the laser machining head by more than the calculated maximum deviation.

The actual position of the laser machining head can be compared with its desired position in a simple, very quick and effective way at any stage of processing the workpiece or at any phase of setting up the laser machining machine. Thus, it can be checked whether an undesired geometric deviation exists, and thus a finding is made concerning whether the machine has (yet) been faultlessly set up, and whether the processing of the workpiece can be continued or whether a counter-measure should be taken. In particular, a geometric calibration of the laser machining head carried out previously, and that is generally intricate, can be checked, using the method, in a simple, quick and effective manner. The latter especially makes it possible to check whether the numeric offset values of the kinematic chain for positioning the laser machining head in the space stored in a numerical control (NC) control system of the laser machining machine match the actual mechanical offsets. The procedure of initially processing a first workpiece and subsequently drawing upon its manufacturing precision to indirectly check the calibration can be dispensed with. The method makes it possible to check the calibration of the laser machining head and/or the movably coupled components of the kinematic chain manipulating the laser machining head when processing workpieces.

In the first machining position of the laser machining head, the through-opening is either pierced into the workpiece at the desired position of the workpiece as a selective piercing hole or cut out from the workpiece around the desired position of the workpiece. In contrast to the first case, where the diameter of the through-opening corresponds to the laser beam diameter, the dimensions of the through-opening are, in the latter case, greater than the laser beam diameter. The through-opening is preferably introduced into a section of the workpiece which is cut off as a reject when further machining the workpiece.

In the second machining position of the laser machining head the process radiation is detected, which is generated by way of an interaction between the laser beam and the workpiece. If the laser beam passes through the through-opening, and therefore no process radiation is generated, the actual position of the laser beam on the workpiece deviates from its desired position at the most by the dimensions of the through-opening, and, as a result, the actual position of the laser machining head deviates from its desired position at the most by an amount that depends upon the dimension of the through-opening and upon the two machining positions of the laser machining head. In the case of the selective piercing hole, the actual position of the laser machining head exactly matches its desired position. If the laser beam does not, on the other hand, pass through the through-opening, but collides with workpiece material, so that process radiation is generated, the actual position of the laser beam on the workpiece deviates from its desired position at the most by the dimension of the through-opening, and, as a result, the actual position of the laser machining head deviates from its desired position at the most by an amount that depends upon the dimension of the through-opening and upon the two machining positions of the laser machining head.

In some implementations, the method is carried out at predetermined intervals, e.g., after every fifth, tenth or twentieth workpiece of a series of workpieces that are processed one after the other.

In the second machining position, at least one axial position of the axes of motion of the laser machining machine moving the laser head needs to differ from the respective axial position in the first machining position. What is especially preferred is if the laser machining head in step c) is moved along at least one axis of motion that is not used when introducing the through-opening, e.g., swiveled by at least one unused axis of motion and/or proceeded along at least one unused axis of motion. The through-opening may, for example, be cut out from the workpiece by proceeding the laser machining head in an X and Y direction, and the laser machining head in step c) subsequently is moved by being rotated by 180° around the direction of the beam (C axis), from the first to the second machining position. Alternatively, the laser beam may, in the second machining position, also, for example, hit the desired position from the same direction and at the same angle as in the first machining position, if the laser machining head is, in the second machining position, displaced with respect to the first machining position in the direction of the beam (Z axis) and/or twisted around the laser beam axis.

The laser beam emitted by the laser machining head to introduce the through-opening in step b) preferably hits the workpiece surface substantially at a right angle. Advantageously, the laser beam hits the horizontally aligned workpiece surface rectangular, so that the workpiece material that is cut out, for example a circular scrap, can fall out of the through-opening downwards.

Further, in the event of a deviating actual position being determined, a geometric calibration of the laser machining head is preferably carried out. It is thus avoided, for example, that imprecisely processed workpieces are generated, due to a preceding faulty calibration or collision. The calibration is preferably carried out automatically. As an alternative, an alarm can also be used to indicate to the operating staff that the actual position deviates from the desired position, or the processing of a workpiece that has already commenced can be halted.

In a preferred calibration variant, in the event of radiation being detected in step c) the laser machining head with a continuous or pulsed irradiating laser beam is moved from the second machining position relative to the workpiece, until, in a third machining position of the laser machining head, no further radiation is detected, because the laser beam passes through the through-opening. From the offset between the second and the third machining position, any deviation of the actual position of the laser machining head from its desired position can at least be determined approximately. In addition, it is also possible that the laser machining head with a continuous or pulsed irradiating laser beam is moved from its third machining position relative to the workpiece, and, thereby, the actual positions of boundary points of the through-opening being recorded by means of the transitions between detected and non-detected radiation, that the actual position and/or the actual contour of the through-opening is determined by means of the actual positions of the boundary points, and that a deviation between the actual position of the laser machining head and its desired position is determined, at least approximately, based on the offset between the actual and the desired position of the through-opening and/or based on the deviation between the actual and desired contour of the through-opening.

Another preferred calibration variant stipulates that, in the event of no radiation being detected in step c), the laser machining head with a continuous or pulsed irradiated laser beam is moved relative to the workpiece, and, thereby, the actual positions of boundary points of the through-opening being recorded by means of the transitions of detected and non-detected radiation, that the actual position and/or the actual contour of the through-opening is determined by means of the actual positions of the boundary points, and that a deviation between the actual position of the laser machining head and its desired position is determined, at least approximately, based on the offset between the actual and the desired position of the through-opening and/or based on the deviation between the actual and desired contour of the through-opening.

In both calibration variants, it is advantageous, for discovery, or for rapid boundary recognition of the through-opening, if the laser beam is moved along a predetermined movement pattern, in particular a meandering movement pattern, relative to the workpiece. In the event of the laser beam being irradiated pulsed, with the full cutting power, the desired positions of the individual, irradiated laser pulses should not overlap spatially on the workpiece, as otherwise, e.g., if adjacent laser pulses overlap spatially on the workpiece, the edge of the workpiece is further removed with each laser pulse, without enough light being generated to detect the interaction. In that respect, the laser beam is, to obtain an advantage, preferably moved relative to the workpiece, in such a way that the desired positions of the laser pulses of the desired contour of the through-opening do not approach one another at a right angle, but at as shallow an angle as possible. Through this measure it can be ensured that every laser pulse hits workpiece material that has not already been processed by the previous laser pulse.

Another aspect of the invention features a laser machining machine for carrying out the method in accordance with the invention, including a movably mounted laser machining head for processing workpieces by means of a laser beam, a control device that is programmed to move the laser machining head into the first machining position and introduce the through-opening into the workpiece at the desired position or around the desired position of the workpiece by means of the laser beam, and subsequently move the laser machining head into the second machining position, a sensor for detecting radiation generated by an interaction between the laser beam and the workpiece, and an evaluation device that is programmed to check whether an actual position of the laser machining head corresponds to its desired position or deviates from it, based on the radiation detected.

Another aspect of the invention features a computer program product that comprises coding that is adapted to carry out all the steps of the method in accordance with the invention once the program runs on a control device of a laser machining machine.

Further advantages and advantageous embodiments of the subject of the invention can be seen from the description, the claims and the drawing. The above-mentioned features, as well as the further features listed below, can likewise be used independently or multiple features combined as desired. The embodiments shown and described are not to be understood as a conclusive list, but should rather be treated as examples to illustrate the invention. The figures in the drawing show the subject in accordance with the invention in a highly schematic way, and are not to be understood as being drawn to scale. The following can be seen:

DETAILED DESCRIPTION

Figure 1:
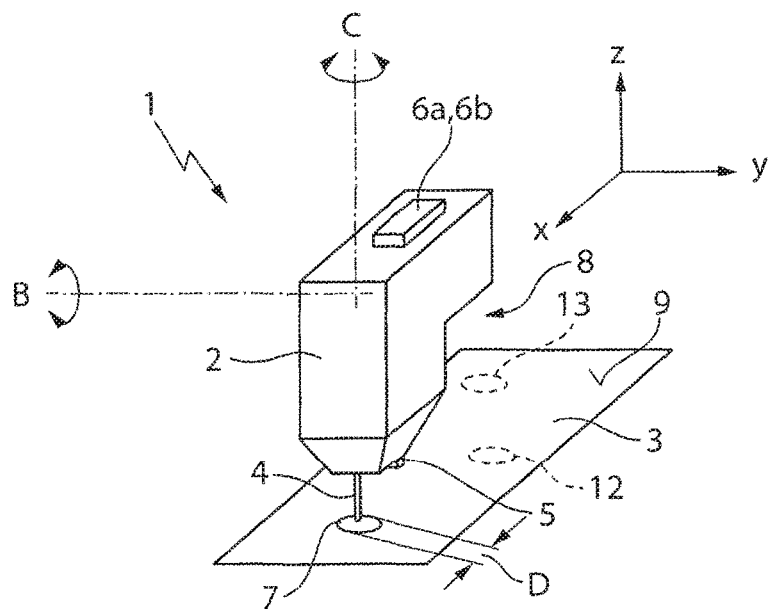
FIG. 1 shows a laser machining head of a laser machining machine in a first machining position.

FIG. 1 shows a laser machining machine 1 with a movably mounted laser machining head 2 for processing a workpiece 3 (e.g., a sheet metal) using a laser beam 4. The laser machining machine 1 has a sensor 5 for detecting radiation generated by an interaction between the laser beam 4 and the workpiece 3, as well as a control device 6a and an evaluation device 6b. The laser machining head 2 can be moved translationally along multiple axes X, Y and Z in relation to a machine base of the laser machining machine 1 that is usually fixed (not shown) and/or pivoted around the B and C axes. The workpiece 3 is usually fixed to the machine base, e.g., clamped.

When processing the workpiece 3 using the laser machining head 2, workpieces 3 may be processed defectively due to misalignments of the laser machining head 2, e.g., in cases where an actual position of the laser machining head 2 deviates from its desired position. The causes of such misalignments or deviations may, for example, be faulty preceding geometric calibrations of the laser machining head 2 in relation to the machine base or undesired preceding collisions of the laser machining head 2 with the workpiece 3 or other parts of the machine base. In order to avoid deviations, a method for determining deviations between the actual position of the laser machining head 2 and the desired position of the laser machining head 2 are described below, with reference to FIG. 1, as well as FIGS. 2A and 2B. Using the method, a check is carried out concerning whether, as shown, for example, in FIG. 2A, the actual position corresponds to the desired position or whether, as shown, by way of example, in FIG. 2B using an offset V, the actual position deviates from the desired position.

As a first procedural step, two different machining positions 8 and 10 of the laser machining head 2 are selected by the control device 6a with the coordinates (x1, y1, z1, b1, c1) and (x2, y2, z2, b2, c2), in which the laser beam 4 emitted by the laser machining head 2 is directed towards the same desired position on the workpiece 3. The two machining positions 8 and 10 at least differ in one of their coordinates.

As a second procedural step, the laser machining head 2 is moved into the one selected, first machining position 8 and a through-opening 7 is introduced into the workpiece 3 at the desired position or around the desired position of the workpiece 3 by means of the laser beam 4. The through-opening 7 is either pierced into the workpiece at the desired position of the workpiece as a selective piercing hole or cut out from the workpiece around the desired position of the workpiece 3. In contrast to the first case, where the diameter D of the through-opening 7 corresponds to the laser beam diameter, the dimensions D of the through-opening 7 are, in the latter case, greater than the laser beam diameter. The through-opening 7 is shown in the figures exaggerated in size, by way of illustration. In that respect, the laser beam 4 preferably hits the horizontally aligned topside 9 of the workpiece 3 vertically.

Figure 2A:
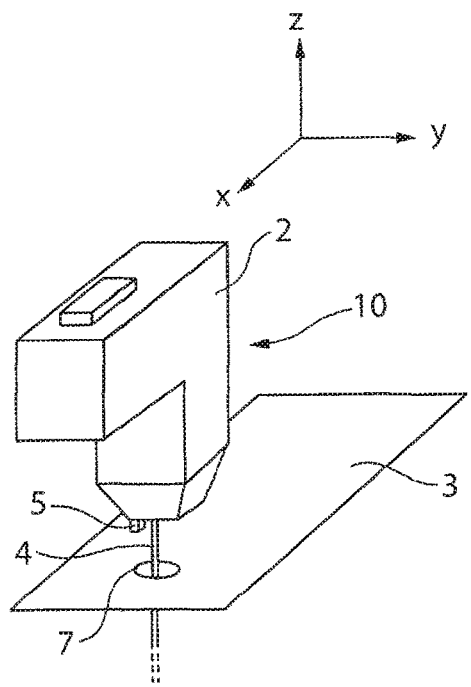
FIG. 2A shows the laser machining head shown in FIG. 1 in a second machining position, which corresponds to a desired position.
Figure 2B:
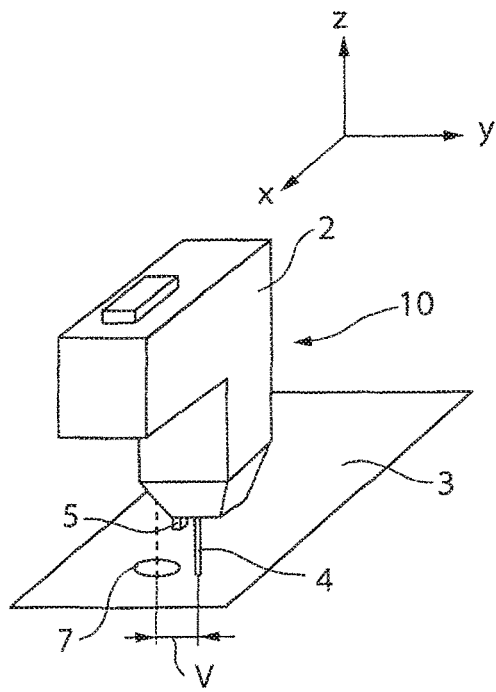
FIG. 2B shows the laser machining head shown in FIG. 1 in a second machining position, which deviates from the desired position in accordance with FIG. 2A.

As a third procedural step, the laser machining head 2 is, when the laser beam 4 is switched off, moved into the other selected, second machining position 10, which is shown in FIG. 2A or 2B. In comparison to FIG. 1, the laser machining head 2 has, in FIGS. 2A and 2B, been moved by being rotated through 180° around the C or the Z axis and being shifted in the X direction, from the first machining position 8 into the second machining position 10. The laser machining head 2 can also, as an alternative, be moved around other or all available axes X, Y, Z, B, C into the second working position 10. The laser beam 4 is switched on, and the radiation that is generated by an interaction between the laser beam 4 and the workpiece 3 is detected by the sensor 5. If the laser beam 4 passes through the through-opening 7, and therefore no process radiation is generated, the actual position of the laser beam 4 on the workpiece 3 deviates from its desired position at the most by the dimension D of the through-opening 7, and, as a result, the actual position of the laser machining head deviates from its desired position at the most by an amount that depends upon the dimension D and upon the two machining positions 8 and 10 of the laser machining head 2. In the case of the selective piercing hole, the actual position of the laser machining head 2 exactly matches its desired position. If the laser beam 4 does not, on the other hand, pass through the through-opening 7, but collides with workpiece material, and process radiation is thus generated, which is detected by the sensor 5, the actual position of the laser beam 4 on the workpiece 3 deviates from its desired position at the most by the dimension D of the through-opening 7, and, as a result, the actual position of the laser machining head 2 deviates from its desired position by at least the amount that depends upon the dimension of the through-opening D and upon the two machining positions of the laser machining head 2.

The radiation detected by the sensor 5 can, for example in the case of the interaction, be process light and/or thermal radiation generated. When the laser beam 4 interacts with the workpiece 3, process radiation arises, with wavelengths that are typically located in the ultraviolet (UV) or visual light (VIS) range. Such process radiation and/or thermal radiation (in the near infrared (NIR) or infrared (IR) range), that is generated when the workpiece 3 is heated up by the laser beam 4, can be detected using the sensor 5. The radiation detected by the sensor 5 can also be laser radiation reflected back from the workpiece 3. In such a case, the workpiece 3 is of a material that at least partially reflects the laser radiation, which is typically the case with metallic workpieces, in particular with metal sheets. In order not to bring about any major changes in the workpiece surface 9 by irradiating the laser beam 4 if there is a deviation V between the actual position and the desired position and the laser beam 4 consequently interacts with the workpiece material when irradiating the desired position of the through-opening 7, the intensity of the laser beam 4 can be reduced when irradiating from the second machining position 10 in comparison to the intensity of the laser beam 4 when introducing the through-opening 7. Besides the laser beam 4 used for processing (for cutting), as an alternative another laser can also be used, in particular a laser with a different wavelength, for irradiating the desired position of the through-opening 7. The evaluation device 6b of the laser machining machine 1 is programmed to check, based on the radiation detected, whether the actual position of the laser machining head 2 corresponds to its desired position or deviates from it.

The procedural steps described above can be carried out repeatedly at multiple positions 12, 13 at a distance from one another of a workpiece 3 to be processed (cf. FIG. 1). Thus, deviations in the actual or desired position of the laser machining head 2 can be registered, depending upon their position. In the case of such deviations that are dependent upon position, the members manipulating the laser machining head 2 are to be offset in relation to one another in such a way, and/or the kinematic chain is to be untuned in such a way that the deviations at different positions 12, 13 of the processing area of the laser machining machine 1 are of different sizes. Accordingly, such deviations that are dependent upon position have more effect, for example at a first position 12 of the workpiece 3 than at another, second position 13 of the workpiece 3. The procedural steps described above can be carried out chronologically and consecutively, for example, first of all at the first position 12 of the workpiece 3 and subsequently at the further positions of the workpiece 3.

Figure 3:
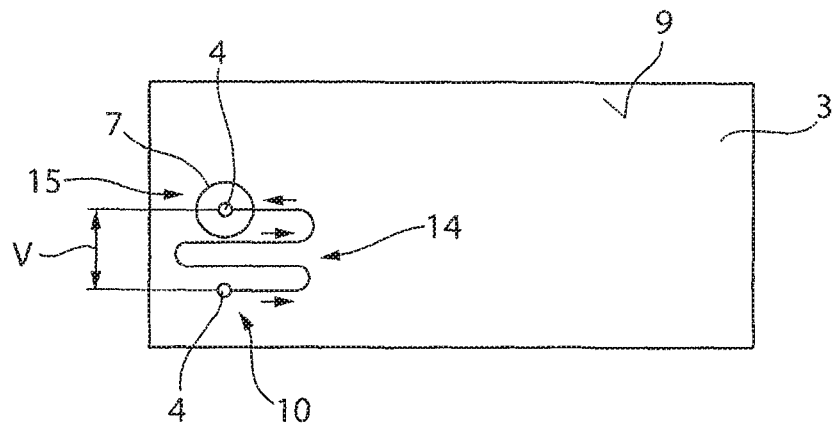
FIG. 3 is a view from above onto the workpiece processed using the laser machining head, wherein the laser beam is moved to find a through-opening above the workpiece.

In FIG. 3, the workpiece 3 is shown as a view from above with the through-opening 7 introduced into it. In the event of an actual position of the laser machining head 2 which deviates from its desired position being determined after carrying out the method described above, a calibration of the laser machining head 2 can be carried out as a further procedural step. To this end, the laser machining head 2 (in FIG. 3 only indicated by means of the laser spot of the laser beam 4) is moved from the second machining position 10, in which the laser machining head 2 deviates from the desired position, with an irradiating laser beam 4 along, for example, a meandering movement pattern 14 relative to the workpiece 3, until, in a third machining position 15 of the laser machining head 2 with the coordinates (x3, y3, z3, b3, c3), no radiation generated by an interaction between the laser beam 4 and the workpiece 3 is detected. From the offset V between the second and the third machining positions 10 and 15, any deviation of the actual position of the laser machining head 2 from its desired position is determined, and this information can then be used to calibrate the coordinates of the laser machining head 2.

Through the meandering movement pattern 14, the workpiece surface 9 can be reliably scanned until the through-opening 7 is found. When the laser machining head 2 is moving from the second machining position 10 to the third machining position 15, the laser of the laser machining head 2 is preferably operated with a pulsed intensity, or an intensity that is reduced in comparison to the normal cutting procedure, or another laser is used that has a correspondingly reduced intensity.

Figure 4:
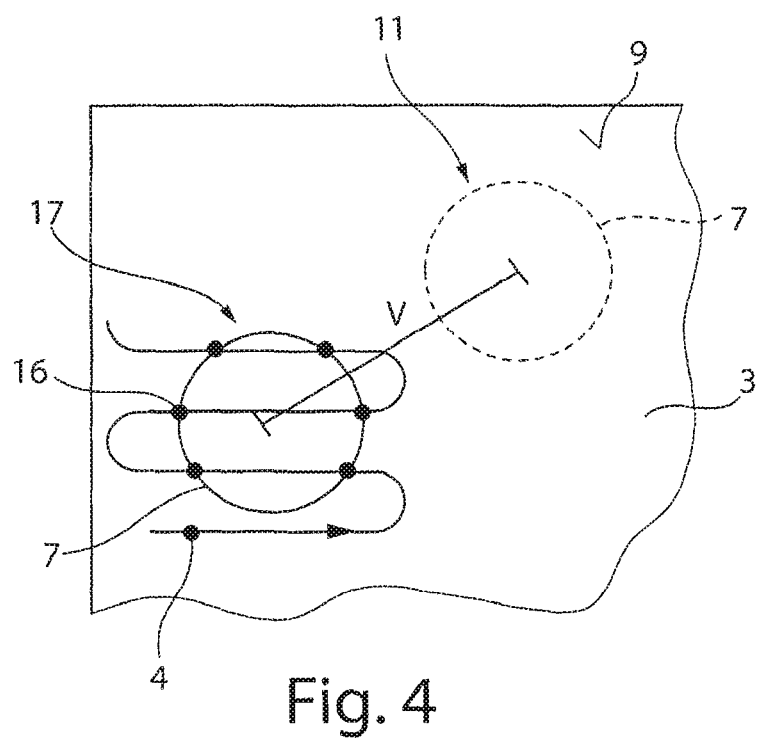
FIG. 4 is a view from above onto the workpiece processed using the laser machining head, wherein the laser beam is moved above the workpiece for the boundary of the through-opening to be recognized.

In the event of the cut-out through-opening 7, the deviation of the laser machining head 2 can also be determined via edge recognition of the through-opening 7, as described below with reference to FIG. 4. The laser machining head 2 with a continuous or pulsed irradiating laser beam 4 is moved relative to the workpiece 3, and, thereby, the actual positions of boundary points 16 of the through-opening 7 are determined using the transitions of detected and non-detected radiation. In the evaluation device 6b, the actual position 17 of the through-opening 7 is then determined using the actual positions of the boundary points 16, and any deviation of the actual position of the laser machining head 2 from its desired position is determined from the offset V between the actual position of the through-opening 7 and the desired position 11 represented with a dotted line. Alternatively, or in addition, the actual contour of the through-opening 7 can also be determined, and any deviation of the actual position of the laser machining head 2 from its desired position determined from the offset V between the actual and the desired contour of the through-opening 7. The deviation determined can be used for calibrating the coordinates of the laser machining head 2.

In the event of the laser beam being irradiated pulsed with a full cutting power during edge recognition, the desired positions of the adjacent laser pulses of the laser beam 4 on the workpiece 3 should not overlap spatially, as otherwise the edge of the workpiece will be further removed with each laser pulse, without enough light being generated to detect the interaction. During edge recognition, the laser beam 4 should also be moved relative to the workpiece 3 in such a way that the desired positions of the laser pulses of the laser beam 4 does not approach the desired contour of the through-opening 7 rectangular, but at a shallow angle, so that the laser pulses do not hit a workpiece material already processed by a previous laser pulse.

A number of embodiments of the invention have been described. Nevertheless, it will be understood that various modifications may be made without departing from the spirit and scope of the invention. Accordingly, other embodiments are within the scope of the following claims.

What is claimed is:

1. A method of determining a deviation between an actual position of a laser machining head of a laser machining machine and a desired position of the laser machining head, the method comprising:

selecting at least two different machining positions of the laser machining head, including a first selected machining position and a second selected machining position, in which a laser beam emitted by the laser machining head is directed onto the same desired position of a workpiece fixed to the laser machining machine, the laser machine head being movably mounted along multiple axes of motion;

moving the laser machining head into the first selected machining position and forming a through-opening into the workpiece at the desired position or around the desired position of the workpiece by operation of the laser beam;

moving the laser machining head into the second selected machining position and detecting whether there is radiation generated by an interaction between the laser beam and the workpiece;

calculating a first deviation depending on a size of the through-opening and first and second selected machining positions;

in response to determining that no radiation is detected, determining that the actual position of the laser machining head deviates from the desired position of the laser machining head by less than the calculated first deviation; and otherwise, in response to determining that radiation is detected, determining that the actual position of the laser machining head deviates from the desired position of the laser machining head by more than the calculated first deviation.

2. The method of claim 1, wherein moving the laser machining head into the second selected machining position comprises:

moving the laser machining head along at least one axis of motion not used when forming the through-opening.

3. The method of claim 1, wherein the diameter of the through-opening corresponds to a diameter of the laser beam.

4. The method of claim 1, wherein the formed through-opening is larger than a diameter of the laser beam.

5. The method of claim 1, further comprising:

in response to determining that radiation is detected, moving the laser machining head relative to the workpiece with a continuous or pulsed irradiating laser beam, while detecting whether there is radiation generated by an interaction between the laser beam and the workpiece, from the second machining position, until, in a third machining position of the laser machining head, no further radiation is detected.

6. The method of claim 5, further comprising:

determining a second deviation between actual and desired positions of the laser machining head depending on an offset of the laser beam on the workpiece in the second machining position and the third machining position.

7. The method of claim 5, further comprising:

moving the laser machining head with a continuous or pulsed irradiating laser beam from the third machining position relative to the workpiece;

recording actual positions of boundary points of the through-opening as determined by transitions between detected and non-detected radiation; and determining at least one of an actual center position or contour of the through-opening by the actual positions of the boundary points.

8. The method of claim 7, further comprising:

determining a second deviation between the actual position of the laser machining head and the desired position based on an offset between the determined actual center position or contour of the through-opening and a desired center position or contour of the through-opening.

9. The method of claim 5, wherein the irradiated laser beam is pulsed such that adjacent pulses of the laser beam do not overlap on the workpiece spatially.

10. The method of claim 5, wherein that the laser beam is moved along a predetermined movement pattern relative to the workpiece.

11. The method of claim 10, wherein the predetermined movement pattern comprises a serpentine movement.

12. The method of claim 1, further comprising:

in response to determining that no radiation is detected, moving the laser machining head with a continuous or pulsed irradiated laser beam relative to the workpiece;

recording actual positions of boundary points of the through-opening by transitions of detected and non-detected radiation; and determining at least one of an actual center position or an actual contour of the through-opening by the actual positions of the boundary points.

13. The method of claim 12, further comprising:

determining a second deviation between the actual position of the laser machining head and the desired position of the laser machining head based on at least one of:

an offset between the actual center position of the through-opening and a desired center position of the through-opening, and a deviation between the actual contour of the through-opening and a desired contour of the through-opening.

14. The method of claim 13, wherein the irradiated laser beam is pulsed such that adjacent pulses of the laser beam do not overlap on the workpiece spatially.

15. The method of claim 14, wherein the irradiated laser beam is pulsed, and wherein the laser beam is moved relative to the workpiece in such a way that pulses of the laser beam do not intercept the contour of the through-opening perpendicularly.

16. The method of claim 15, wherein the pulses of the laser beam intercept the contour of the through-opening at a shallow angle.

17. The method of claim 13, wherein that the laser beam is moved along a predetermined movement pattern relative to the workpiece.

18. The method of claim 17, wherein the laser beam is moved along a serpentine movement pattern relative to the workpiece.

19. The method of claim 1, wherein moving the laser machining head into the second selected machining position comprises:

moving the laser machining head from the first selected machining position to the second selected machining position by rotating through 180° around an axis of motion.

20. The method of claim 1, wherein the laser beam emitted by the laser machining head to form the through-opening intercepts the workpiece surface substantially perpendicularly.

21. A computer program product comprising coding adapted to carry out operations once the program runs on a control device of a laser machining machine, the operations comprising:

selecting at least two different machining positions of the laser machining head, including a first selected machining position and a second selected machining position, in which a laser beam emitted by the laser machining head is directed onto the same desired position of a workpiece fixed to the laser machining machine, the laser machine head being movably mounted along multiple axes of motion;

moving the laser machining head into the first selected machining position and forming a through-opening into the workpiece at the desired position or around the desired position of the workpiece by operation of the laser beam;

moving the laser machining head into the second selected machining position and detecting whether there is radiation generated by an interaction between the laser beam and the workpiece;

calculating a specific deviation depending on a size of the through-opening and first and second selected machining positions;

in response to determining that no radiation is detected, determining that the actual position of the laser machining head deviates from the desired position of the laser machining head by less than the calculated specific deviation; and otherwise, in response to determining that radiation is detected, determining that the actual position of the laser machining head deviates from the desired position of the laser machining head by more than the calculated specific deviation.

22. A laser machining machine comprising:

a laser machining head movably mounted along multiple axes of motion for processing workpieces using a laser beam;

a control device configured to:

select at least two different machining positions of the laser machining head, including a first machining position and a second machining position, in which the laser beam is directed onto the same desired position of a workpiece, move the laser machining head into the first machining position, introduce a through-opening into the workpiece at the desired position or around the desired position of the workpiece by the laser beam, and move the laser machining head into the second machining position;

a sensor configured to detect radiation generated by an interaction between the laser beam and the workpiece; and an evaluation device configured to:

calculate a specific deviation depending on a size of the through-opening and the first and second machining positions;

in response to determining that no radiation is detected when the laser machining head is in the second machining position, determine that an actual position of the laser machining head deviates from a desired position of the laser machining head by less than the calculated specific deviation; and otherwise, in response to determine that radiation is detected when the laser machining head is in the second machining position, determine that the actual position of the laser machining head deviates from the desired position of the laser machining head by more than the calculated specific deviation.

* * * * *

UNITED STATES PATENT AND TRADEMARK OFFICE
CERTIFICATE OF CORRECTION

| | | |
|---|---|---|
| PATENT NO. | : 10,207,360 B2 | Page 1 of 1 |
| APPLICATION NO. | : 15/044270 | |
| DATED | : February 19, 2019 | |
| INVENTOR(S) | : Wolf Wadehn and Tobias Hagenlocher | |

It is certified that error appears in the above-identified patent and that said Letters Patent is hereby corrected as shown below:

On the Title Page

Item (72) Inventors, Lines 2-3, delete "Tobias Hagenloche, Ditzingen (DE)" and insert
-- Tobias Hagenlocher, Ditzingen (DE) --

Signed and Sealed this
Ninth Day of July, 2019

Andrei Iancu
*Director of the United States Patent and Trademark Office*